(12) United States Patent
Ramirez et al.

(10) Patent No.: US 6,738,194 B1
(45) Date of Patent: May 18, 2004

(54) RESONANCE TUNABLE OPTICAL FILTER

(75) Inventors: Ayax D. Ramirez, Chula Vista, CA (US); Stephen D. Russell, San Diego, CA (US); Randy L. Shimabukuro, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/200,712

(22) Filed: Jul. 22, 2002

(51) Int. Cl.$^7$ ................................................ G02B 27/00
(52) U.S. Cl. ...................... 359/585; 359/584; 359/588; 359/589; 359/487
(58) Field of Search ................................ 359/584, 585, 359/588, 589, 579, 487, 488, 872, 873

(56) References Cited

U.S. PATENT DOCUMENTS

| | | |
|---|---|---|
| 5,570,139 A | 10/1996 | Wang |
| 5,986,808 A | 11/1999 | Wang |
| 6,031,653 A | 2/2000 | Wang |
| 6,034,820 A * | 3/2000 | Someno et al. ............. 359/585 |
| 6,122,091 A | 9/2000 | Russell et al. |
| 6,384,953 B1 | 5/2002 | Russell et al. |

OTHER PUBLICATIONS

Yu Wang, "Voltage–Induced Color–Selective Absorption with surface plasmons," Applied Physicas Letters, vol. 67 No. 19, Nov. 6, 1995, pp. 2759–2761.

Yu Wang, S. D. Russell, R. L. Shimabukuro, "Electrically Tunable Mirror with Surface Plasmons," Proceedings of SPIE, vol. 3292, 1998, pp. 103–106.

Yu Wang, S. D. Russell, R. L. Shimabukuro, "Surface Plasmon Tunable Filter and Spectrometer–on–a–Chip," Proceedings of SPIE, vol. 3118, 1997, pp. 288–294.

* cited by examiner

*Primary Examiner*—Drew Dunn
*Assistant Examiner*—Fayez Assaf
(74) *Attorney, Agent, or Firm*—Celia C. Dunham; Michael A. Kagan; Andrew J. Cameron

(57) ABSTRACT

An optical modulating device capable of use as a light valve, display, or optical filter, which uses variation in incident angle to exploit color-selective absorption at a metal-dielectric interface by surface plasmons. The device includes a dielectric layer, at least one metallic layer through which electromagnetic radiation may be transmitted or reflected, and incident and exit layers which are both optically transmissive. A beam steering mechanism controls the incident angle of the electromagnetic radiation. In one embodiment, an external beam steering mechanism is used to set the incident light angle onto the filter. In another embodiment, the filter is formed as an integral part of, for example, a cantilever. The incident light angle is then controlled by the angle of the filter cantilever.

5 Claims, 5 Drawing Sheets

RESONANCE TUNABLE OPTICAL FILTER

BACKGROUND OF THE INVENTION

This invention relates generally to the fields of optical modulators, light valves, electro-optic filters, projection and flat panel display devices. More specifically, this invention relates to an optical modulating device, light-valve, display, or optical filter, which uses variation in incident angle to exploit color-selective absorption at a metal-dielectric interface by surface plasmons.

In "Voltage-Induced Color-Selective Absorption with Surface Plasmons," Applied Physics Letters, Volume 67, No. 19, Nov. 6, 1995, pp. 2759–2761, Yu Wang reported on the phenomenon of voltage-induced color-selective absorption at a metal/liquid crystal interface with surface plasmons. The surface plasmon, a collective excitation of electrons, absorbs all incident light at the resonance frequency of the plasmon. When incident p-polarized light is absorbed at the surface plasmon resonance, the reflected light will show a color complementary to that which is absorbed.

Wang teaches that by using a liquid crystal, whose dielectric constant varies with applied voltage, one can change the resonance frequency of the surface plasmon, which in turn provides a concomitant change in absorption. Changing the dielectric constant of the liquid crystal through the application of voltage results in the reflected light showing a color change.

FIG. 1 schematically shows the prior art as taught by Wang. In this figure, the projection display 10 includes a substrate 11, bottom electrode 12, alignment layers 13, spacers 14, top electrode 15, liquid crystal 16 and seal 17. Alignment layers 13, typically formed by deposition of an oxide or polyimide layer and mechanical rubbing of the surface, are required to be employed to impart a preferred direction to the liquid crystal 16. Spacers 14 are required to set the desired spacing between top electrode 15 and bottom electrode 12. Seal 17 is required to contain liquid crystal 16 between top electrode 15 and bottom electrode 12.

In U.S. Pat. No. 5,570,139, Wang describes a similarly designed liquid crystal embodiment and how this embodiment may be employed in projection display applications.

In U.S. Pat. No. 5,986,808, Wang describes a surface plasmon tunable filter using metallic layers bordering a dielectric region with an adjustable air gap as a dielectric. Wang teaches the use of piezoelectric spacers to physically expand or contract the air gap when a voltage is applied.

Similarly, in U.S. Pat. No. 6,031,653, Wang describes thin-film metal interference filters forming a Fabry-Perot cavity in which piezoelectric spacers are used to control an air gap between two metal films.

The complexities of liquid crystal and incorporated piezoelectric structures pose substantial limitations towards the ability to rapidly and easily manufacture optical modulating devices in great numbers and at once.

This invention provides an improved design for a surface plasmon device by relaxing the need for an electro-optic material, electrical bias, and capacitor device structure. The design also avoids the requirements of liquid crystal configurations, such as spacers, alignment layers, and seals.

SUMMARY OF THE INVENTION

The invention is an optical modulating device, capable of being used as a light valve, display, or optical filter, for example, uses variation in incident angle to exploit color-selective absorption at a metal-dielectric interface by surface plasmons.

The invention includes a dielectric layer, at least one metallic layer through which electromagnetic radiation may be transmitted or reflected, and incident and exit layers which are both optically transmissive layers. A beam steering mechanism 14 controls the incident angle 15 of the electromagnetic radiation 13. In one embodiment, an external beam steering mechanism is used to set the incident light angle onto the filter. In another embodiment, the filter is formed as an integral part of, for example, a cantilever. The incident angle is then controlled by the angle of the filter cantilever.

BRIEF DESCRIPTION OF THE DRAWINGS

For a more complete understanding of this invention, reference is now make to the following detailed description of the embodiments as illustrated in the accompanying drawings wherein.

DESCRIPTION OF THE PREFERRED EMBODIMENT

Figure 1:
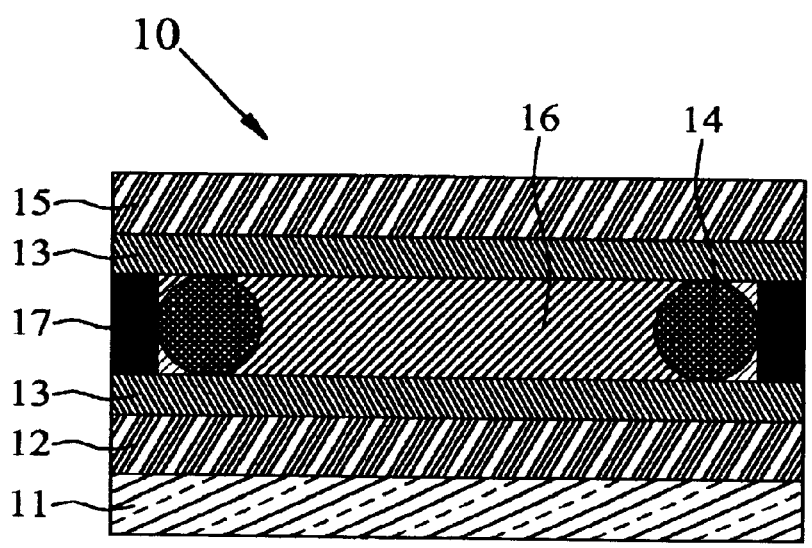
FIG. 1 is a cross-sectional side view of a liquid crystal light valve according to the prior art.
Figure 2:
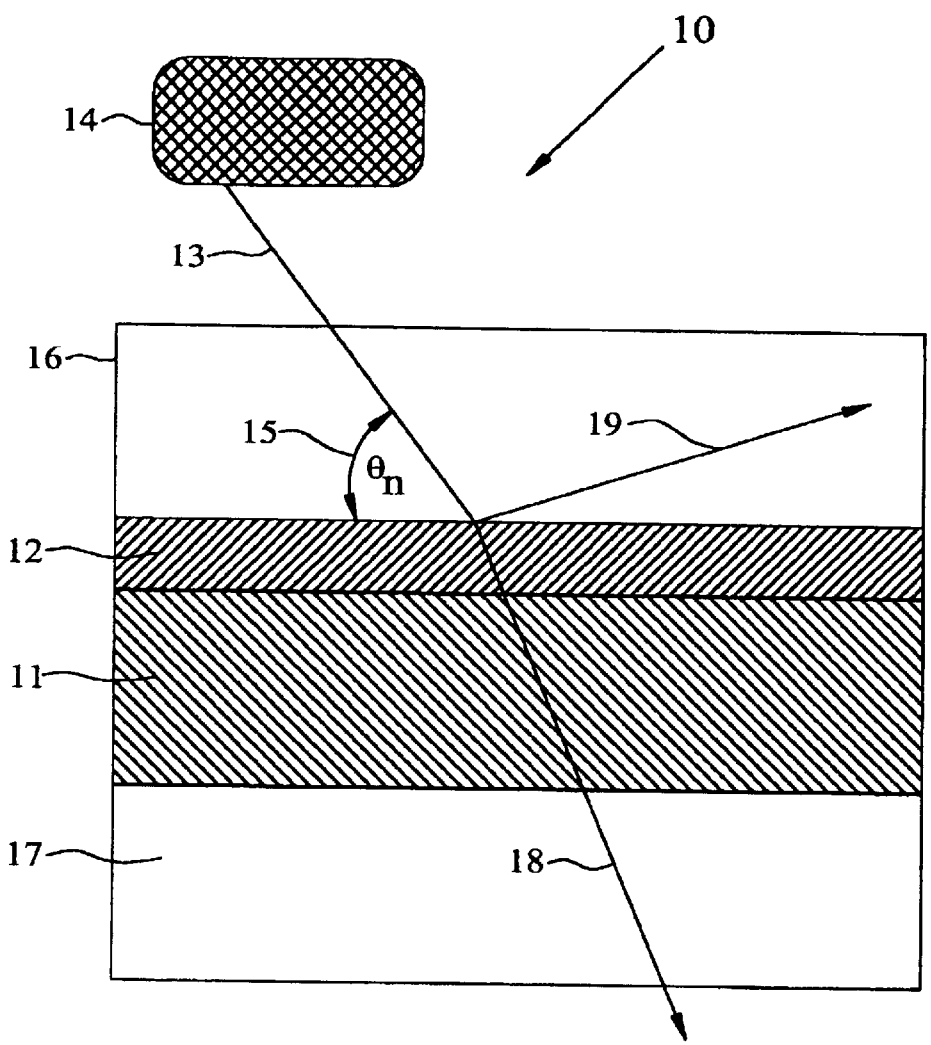
FIG. 2 is a cross-sectional side view of the invention.

A resonance tunable optical filter 10 is shown schematically in FIG. 2. The filter 10 includes a dielectric layer 11, a metallic layer 12 through which electromagnetic radiation 13 may be transmitted 18 or reflected 19. A beam steering mechanism 14 controls the incident angle 15 of the electromagnetic radiation 13. Incident layer 16 and exit layer 17 are both optically transmissive layers.

Figure 3:
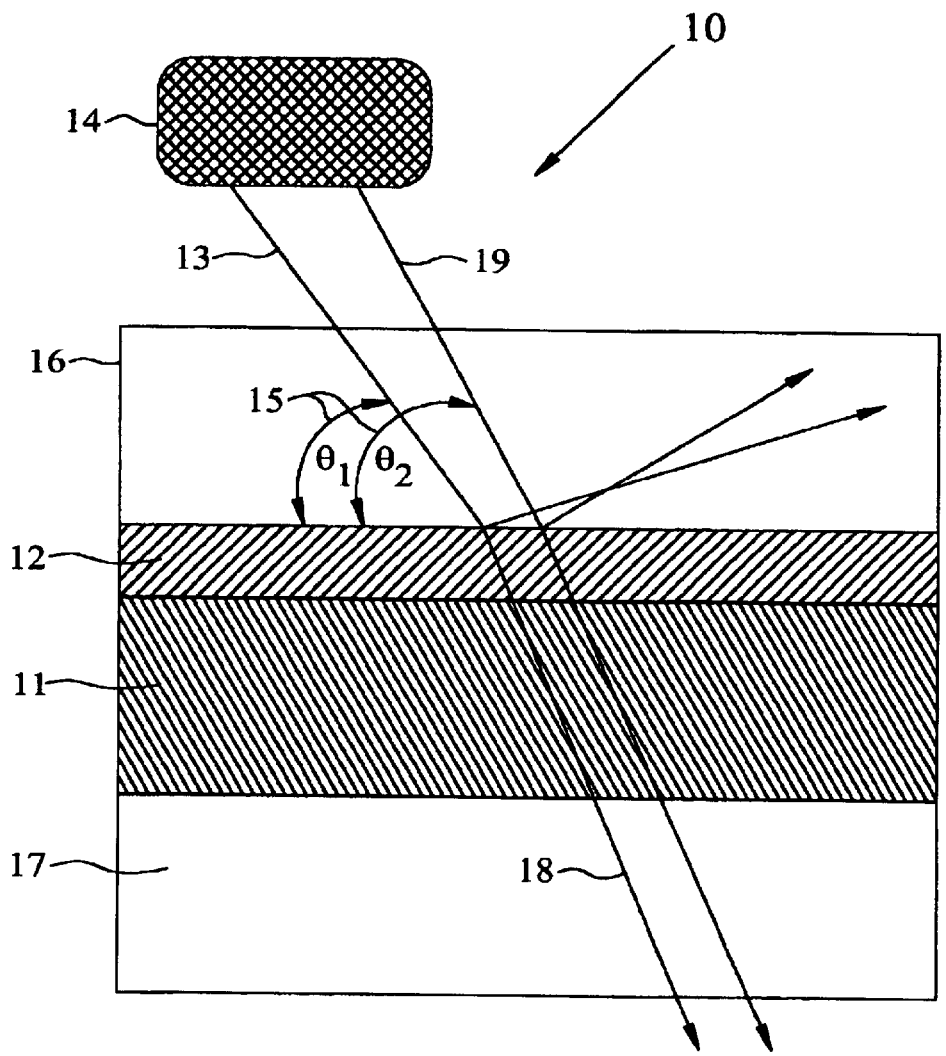
FIG. 3 is a cross-sectional side view of the invention illustrating the reflective mode.

Referring to FIG. 3, a reflective mode of operation of the invention will be described by way of example. Incident layer 16 is SF57 glass, which is illuminated with p-polarized white light 13 at an angle 15 with value $\theta_n$, with respect to the horizontal. Metallic layer 12 is composed of a silver coating with a thickness of 55 nanometers. Dielectric substrate 11 is composed of liquid crystal with a thickness of 10 millimeters supported by the exit layer 17, a BK7 glass substrate.

Figure 4:
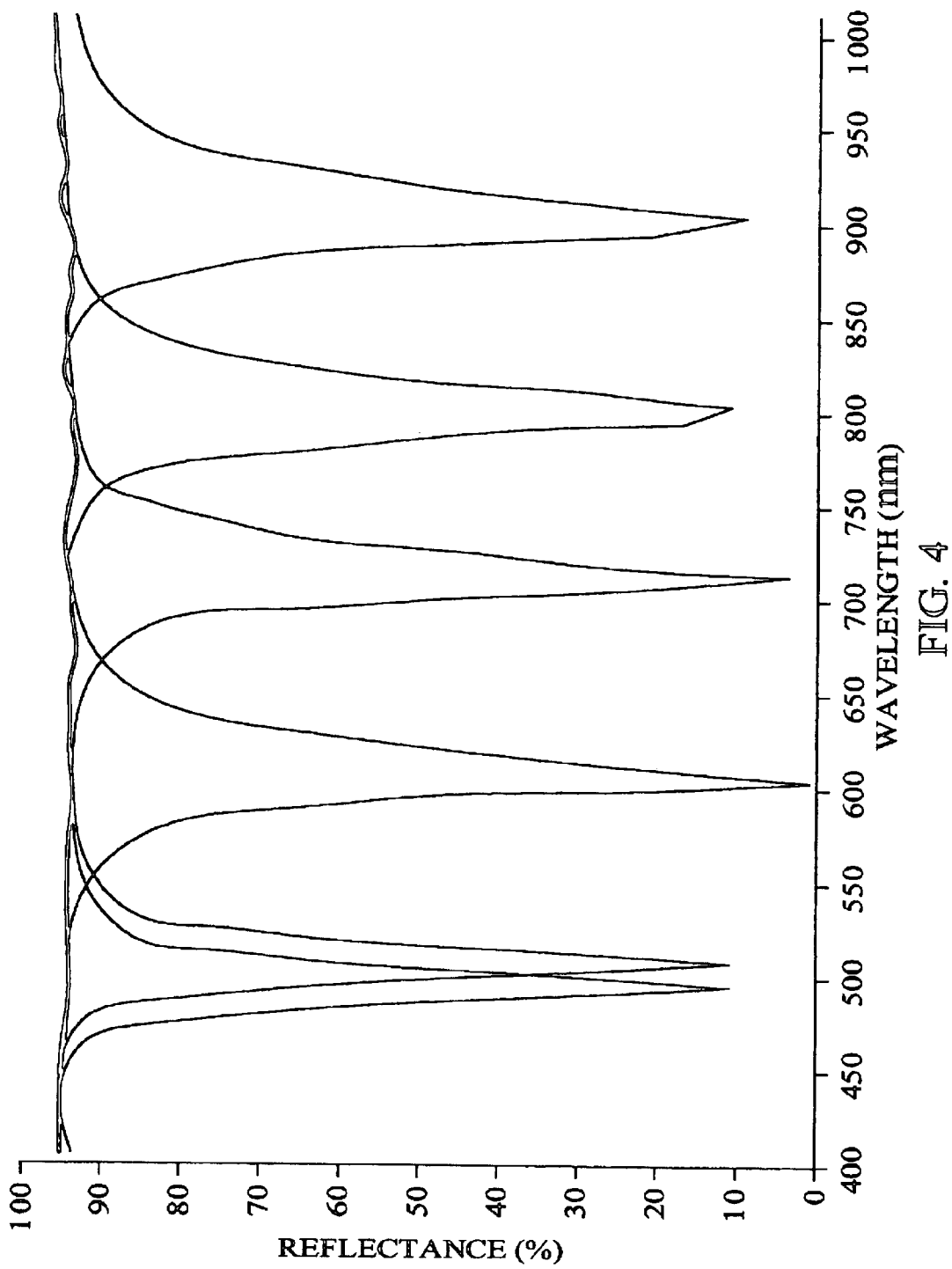
FIG. 4 is a graph which shows the percentage of light reflected at specific wavelength values.
Figure 5:
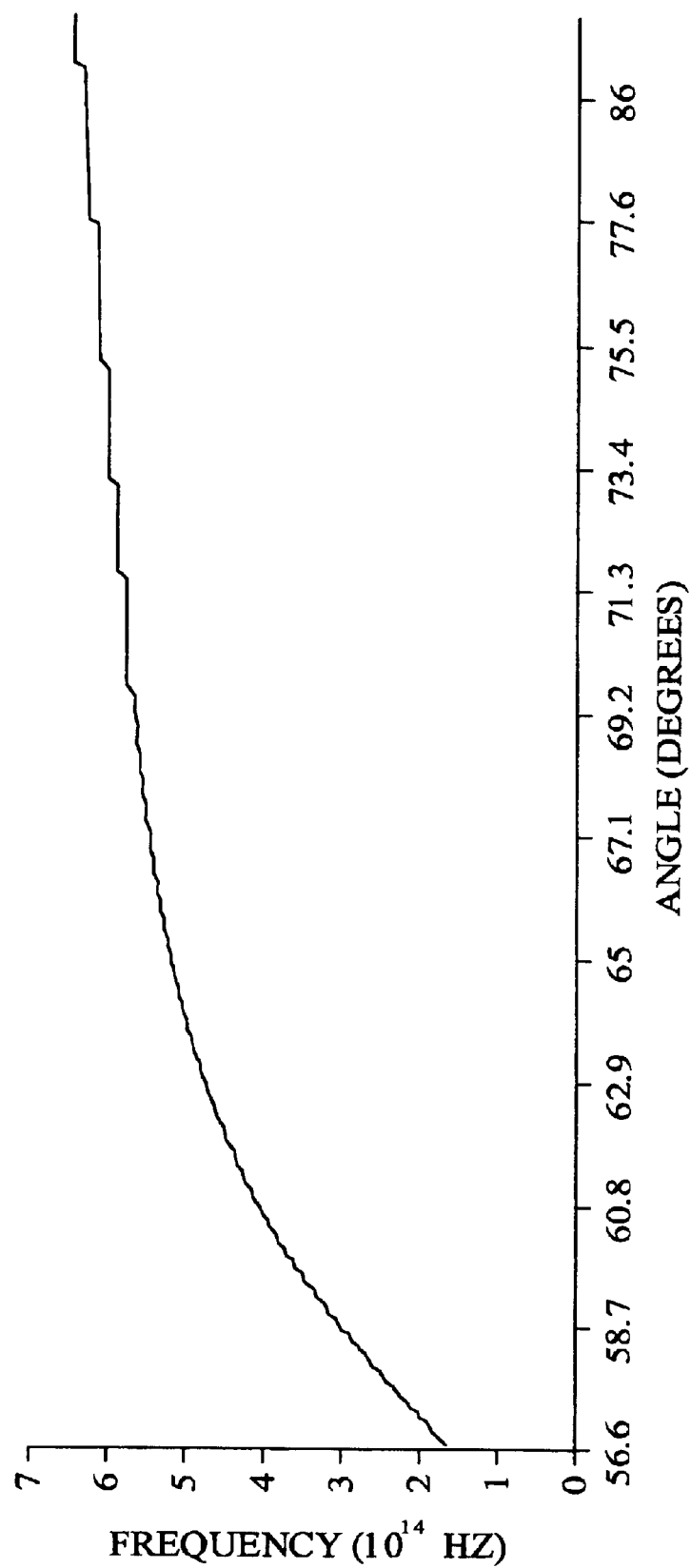
FIG. 5 is a graph which shows the shift in surface plasmon resonance as the incidence angle is varied.

As the angle of incidence 15 of p-polarized white light 13 is varied from $\theta_1$ to $\theta_2$ by the beam steering mechanism 14, the surface plasmon resonance frequency shifts and thereby changes the transmission wavelength. The percentage of light reflected at specific wavelength values is shown in FIG. 4. As the incident angle varies, surface plasmon absorption shifts. About 10 percent reflectance is obtained for angles θ=58.9°, 59.8°, 60.9°, 63.6°, 71.0°, and 72.9°. FIG. 5 shows the effects of varying the incident angle from 56.6°, the minimum incident angle at which resonance is observed, to 80.0°, the maximum incident angle at which resonance is observed. Note that as the incident angle is increased, the surface plasmon resonance frequency shifts from $1.7 \times 10^{14}$ to $6.4 \times 10^{14}$ Hz and the surface plasmon absorption shifts from red to blue.

In the preferred embodiment, the beam steering mechanism used to control the incident angle may be performed mechanically, electro-optically, acousto-optically, and the like. As shown in the example, extrinsic beam steering is used to set the incident light angle onto the filter. This includes the use of a MEMS micro-mirror or a macroscopic mirror. The disclosed embodiment also allows for the device to be formed as an integral part of, for example, a cantilever. The incident angle is then controlled by the angle of the filter cantilever.

The preferred embodiment of the invention includes suitable variations in the materials used in the fabrication of the optical filter. The dielectric layer may be any material with suitable optical properties which, taken in combination with the optical properties of the metallic layer, the incident angle, and wavelength will achieve the desired surface plasmon resonance condition. In the preferred embodiment, the dielectric layer is not an electro-optic material; however, such material is not precluded from use, as shown in the example using liquid crystal. Suitable material for the dielectric layer includes materials from the class of Aurivilius oxides, such as bismuth strontium tantalite and its alloys, which possess electro-optic properties. Other suitable materials include electro-optical materials with a perovskite structure, such as lead zirconate titanate (PZT) and lead lanthanum zirconate titanate (PLZT).

The disclosed embodiment allows for tailoring of the resonance frequency range by using single or multiple metallic layers. The optical filter may be operated in either reflective or transmissive mode; and the incident and exit layers may be selected from any suitable optically transmissive material including, but not limited to, silica glass, BK7 glass, SF57 glass, doped silica glass, air, and vacuum.

The disclosed embodiment also allows for ease in concatenating the device with other components, including semiconductor devices and circuits for monolithic integration for integrated control circuitry, electrical addressing, system interfacing, and the like.

Obviously, many modifications and variations of the invention are possible in light of the above teachings. It is therefore to be understood that within the scope of the appended claims, the invention may be practiced otherwise than as specifically described.

The invention claimed is:

1. An optical filter comprising:

a first transparent layer;

a dielectric layer disposed upon said first transparent layer;

at least one metallic layer disposed upon said dielectric layer;

a second transparent layer disposed upon said at least one metallic layer;

a light source for providing an incident beam;

a polarizer for coupling to said incident beam;

a means for controlling the angle of said incident beam, wherein said means for controlling said angle includes the use of a MEMS micro-mirror, a macromirror, or a cantilever.

2. The optical filter of claim 1 wherein said dielectric layer includes electro-optical materials with a perovskite structure.

3. The optical filter of claim 2 wherein said electro-optical material with a perovskite structure is lead zirconate titanate (PZT).

4. The optical filter of claim 2 wherein said electro-optical material with a perovskite structure is lead lanthanum zirconate titanate (PLZ).

5. The optical filter of claim 1 wherein said means for controlling said angle of said incident beam is performed electro-optically or acousto-optically.

* * * * *